United States Patent [19]

Suzuki et al.

[11] Patent Number: 4,662,814
[45] Date of Patent: May 5, 1987

[54] MANIPULATOR

[75] Inventors: Masanori Suzuki; Yoshiaki Ichikawa; Nobuyoshi Iwatsuka, all of Hitachi; Norihiko Ozaki, Mito, all of Japan

[73] Assignee: Hitachi, Ltd., Tokyo, Japan

[21] Appl. No.: 657,500

[22] Filed: Oct. 4, 1984

[30] Foreign Application Priority Data

Oct. 5, 1983 [JP] Japan .................. 58-185050

[51] Int. Cl.⁴ .............................................. B25J 9/06
[52] U.S. Cl. .................................. 414/730; 414/735; 901/15; 901/26; 901/28
[58] Field of Search ............ 901/28, 29, 15, 24, 901/25, 26; 414/730, 735; 74/665 H, 665 GB, 469

[56] References Cited

U.S. PATENT DOCUMENTS

| | | | |
|---|---|---|---|
| 4,221,997 | 9/1980 | Fleming | 414/4 X |
| 4,480,495 | 11/1984 | Ohama | 901/28 X |
| 4,502,347 | 3/1985 | Norris et al. | 74/417 |
| 4,531,884 | 7/1985 | Russell | 74/665 H |
| 4,561,816 | 12/1985 | Dingess | 414/4 |

FOREIGN PATENT DOCUMENTS

| | | | |
|---|---|---|---|
| 85307 | 8/1983 | European Pat. Off. | 901/29 |
| 2102590 | 2/1983 | United Kingdom | 414/730 |
| 524685 | 11/1976 | U.S.S.R. | 901/25 |
| 197708 | 9/1977 | U.S.S.R. | 901/15 |
| 814718 | 3/1981 | U.S.S.R. | 901/15 |

Primary Examiner—Joseph E. Valenza
Assistant Examiner—D. Glenn Dayoan
Attorney, Agent, or Firm—Antonelli, Terry & Wands

[57] ABSTRACT

A manipulator suitable for tasks in remote places which are not easily accessible to operators comprises an arm composed of a series of arm modules each having an articulate and an address decoder and being constructed by the arm modules of an identical construction to attain an easy maintenance and high flexibility of the manipulator. The operation of the arm modules is controlled a control system which has a plurality of articulate angular-position commanding circuits and a time-sharing control circuit.

8 Claims, 13 Drawing Figures

MANIPULATOR

BACKGROUND OF THE INVENTION

2. FIELD OF THE INVENTION

The present invention relates to a manipulator and, more particularly, to a remote controlled manipulator which is suited for various tasks in places which are not easily accessible to operators.

2. Description of the Prior Art

Japanese Patent Publication No. 37307/1972 discloses a known manipulator which makes use of wire ropes for transmitting the driving power, while Japanese Patent Laid-Open Publication No. 73463/1977 discloses a manipulator in which concentric driving cylindrical tubes are used for power transmission. In either case, the power transmission means extends through an interior of the manipulator arm and is connected to the respective shafts for articulating the adjacent arm sections. Therefore, the disassembly of the manipulator articulate portion for the purpose of, for example, inspection requires demounting and remounting of the power trnamsission means onto the articulate portion, which makes the work difficult and time-consuming.

Japanese Patent Laid-Open Publication No. 6272/1979 discloses a manipulator composed of a plurality of modules each of which can be detachably onto the next one without disassembly of other modules in order to improve the maintainability thereof. This publication, however, discloses merely the basic concept for a module-type manipulator constituted by detachable modules, and fails to disclose practical and specific means for embodying such module mounting and demounting.

The operation rate of the manipulator used in a remote controlled work in places where the operators do not have access to readily, e.g., a high radioactive level area in a nuclear power plant, underwater, cosmic space and so forth, is affected by the maintainability of the manipulator itself. In particular, in a high radioactive level area, the manipulator requires to be assembled and disassembled in a short time. The task in such area, however, is quite severe and difficult even for the experts.

In general, all of arm sections, articulate mechanisms, and power transmission means incorporated in a manipulator are changed according to the degree of freedom thereof and/or the intended use thereof. This in turn requires the articulate portions to be designed and constructed separately and independently. Consequently, the cost of the manipulator is greatly affected by the number of articulates.

In case that it is required to modify an existing manipulator so as to increase arm flexibility by increasing the number of degree of freedom, e.g., in the case where the manipulator is required to extend to an object by detouring or clearing an obstacle. Judging from the degree of freedom, such modification, however, becomes materially equivalent both in difficulty and cost to the designing and the manufacturing of an entirely new manipulator having a different construction, which undesirably limits the adaptability of the manipulator to various specific working demands.

On the other hand, the module-type manipulator composed of modules each of which can be detachably mounted onto the next one suffers from the following disadvantage in respect of the maintainability thereof. Namely, the cost of the manipulator is raised undesirably because of the necessity for the preparation of modules for maintaining the respective detachable modules. In addition, the provision of a plurality of power transmission lines, such as wire ropes or drive tubes, in the arm causes various types of inconvenience, e.g. an increase in the weight, complication in the construction and difficulties in the maintenance due to an increase of coupling elements between adjacent modules.

SUMMARY OF THE INVENTION

Accordingly, an object of the present invention is to provide a manipulator having a higher flexibility and an improved maintainability.

Another object of the present invention is to provide a manipulator in which a plurality of arm section swing angles in the articulate portions can be controlled by a single driving shaft unit and then the construction of the arm and articulate portion is very much simplified.

In view of the above, the present invention aims at a provision of multi-articulate manipulator composed of a plurality of arm modules each having an articulate, wherein the arm modules is exchangeable one another and is constructed to be the same arrangement as another one.

To this end, the present invention provides a multi-articulate manipulator composed of a plurality of arm modules having respective articulates, wherein each arm module is provided with an articulate address decoder and an articulate control circuit adapted to control a movement of the arm module in respect of the associated articulate portion, these circuits being connected to command circuits for commanding the articulate positions to be desired by means of address lines, data lines and a time-sharing control circuit.

These and other objects, features and advantages of the present invention will become clear from the following description taken in connection with the accompanying drawings.

DESCRIPTION OF THE PREFERRED EMBODIMENTS

Figure 1:
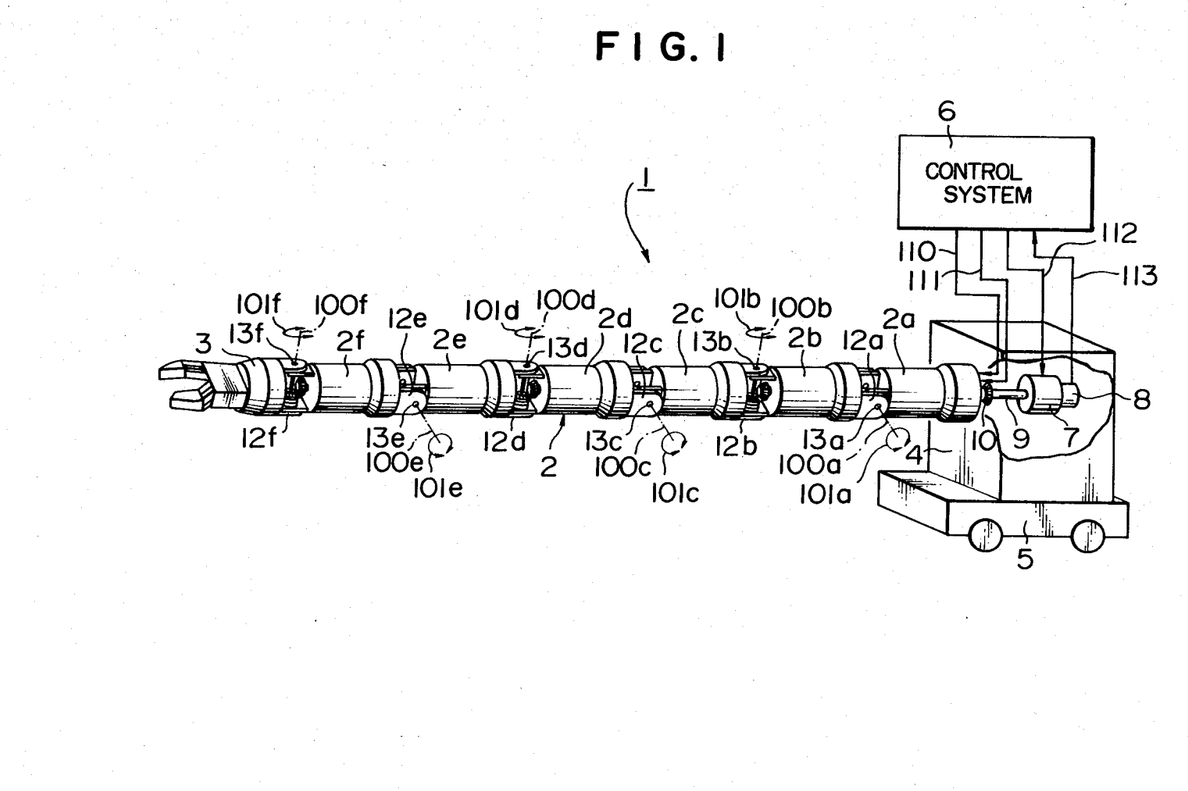
FIG. 1 is a perspective view of an embodiment of a manipulator in accordance with the present invention.

Referring to FIG. 1, a first embodiment of the manipulator of the invention, generally denoted by a reference numeral 1, has a multi-articulate construction composed of a plurality of arm modules 2a to 2f articulated to each other to form an arm 2, and a gripper 3 articulated to an end of the distal arm module 2f. The proximal arm module 2a is connected to a base 4 which is mounted on a carrier 5 and then the manipulator 1 can be carried to any desired working place.

In the described embodiment, the arm modules 2a to 2f have an identical construction. The construction of the arm module 2b will be explained by way of example. As will be seen from FIGS. 2 and 3, the arm module 2b has a hollow arm portion 11b and an articulate portion 12b which is connected to the arm portion 11b for swinging about an axis of an articulate shaft 13b. A drive shaft 14b extends through an interior of the arm portion 11b. Bevel gears 15b and 16b are attached to both ends of the drive shaft 14i b. The bevel gear 16b engages a bevel gear 17 which is fixed to an articulate shaft 25b. As will be seen from FIG. 1, the arm modules 2a to 2f are so arranged that the axes of the articulate shafts 13a to 13f extend orthogonally to each other. The gripper 3 is coupled to the articulate portion 12f of the distal arm module 2f.

Figure 2:
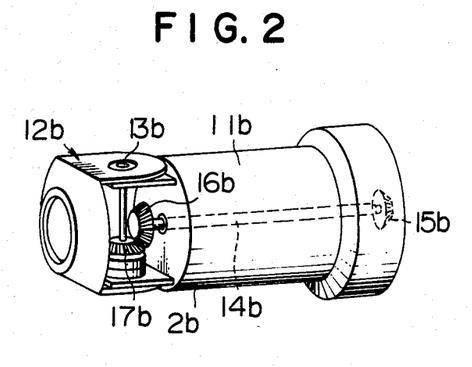
FIG. 2 is a perspective view of an arm module of the manipulator shown in FIG. 1.
Figure 3:
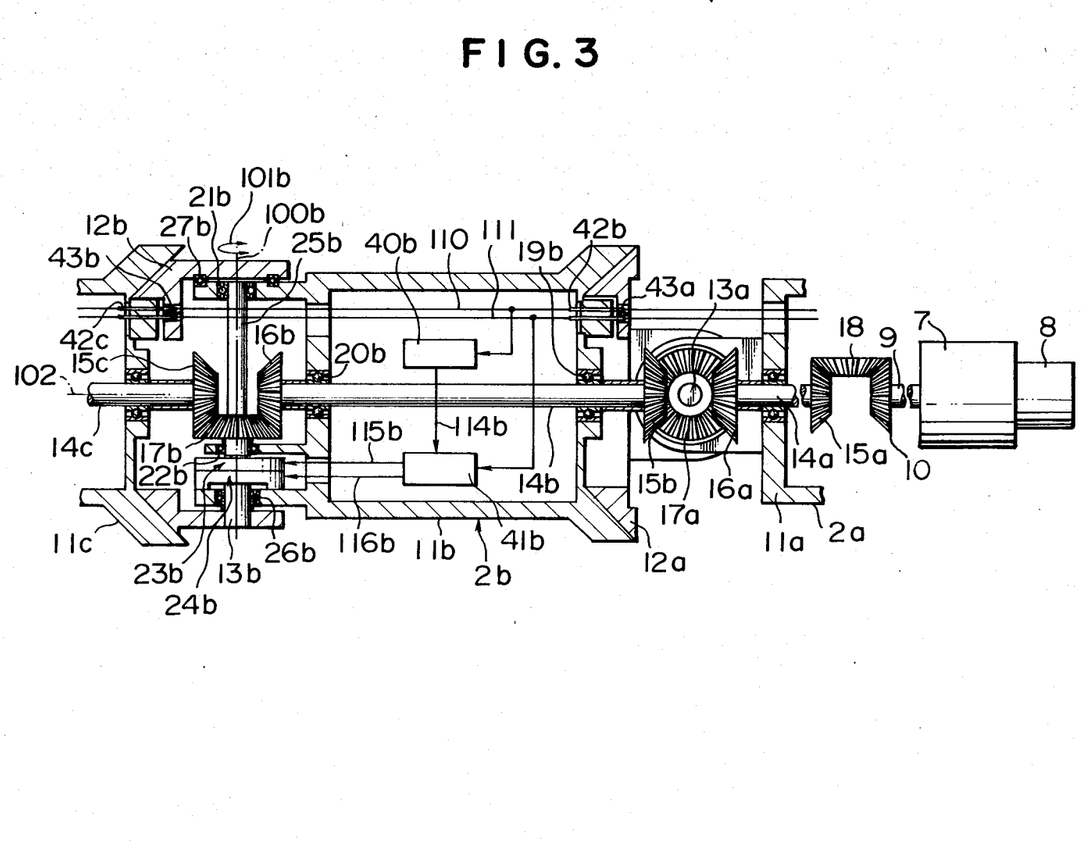
FIG. 3 is a fragmentary longitudinal sectional view of the manipulator shown in FIG. 1.

As will be best seen from FIGS. 2 and 3, the drive shafts 14a to 14f extending through the arm modules 2a to 2f are operatively connected in series through bevel gears 15a-15f, 16a-16f and 17a-17f.

Referring back to FIG. 1, a motor 7 mounted within the base 4 has an output shaft 9 one end of which a bevel gear 10 is fixed to, which drives the bevel gear 15a through a bevel gear 18 (see FIG. 3), so that the torque of the output shaft 9 of the motor 7 is transmitted to the drive shaft 14a and further to the series of drive shafts 14b to 14f through meshing bevel gears.

As shown in FIG. 1, the control system of this manipulator has an address line 110 and a data line 111 which constitute a bi-directional signal line, as well as a motor control line 112 and an encoder signal line 113. The address line 110 and the data line 111 are connected to the arm modules 2a–2f and further to the gripper 3 through the base 4. The motor control line 112 and the encoder signal line 113 are connected, respectively, to the motor 7 and the encoder 8 which are mounted within the base 4.

The arm module will be more specifically explained with reference to FIG. 3 showing the arm module 2b.

The arm portion 11b has a concaved frusto-conical inner peripheral end surface. The outer peripheral end of the articulate portion 12b opposite to the frusto-conical end of the arm portion 11b has a convexed frusto-conical surface. These frusto-conical surfaces complements each other so that the concaved and convexed frusto-conical surfaces of adjacent arm modules closely fit each other. Thus, the proximal frusto-conical concaved inner peripheral end surface of the arm portion 11b of the arm module 2b closely fits the mating frusto-conical convexed peripheral end surface on the articulate portion 12a of the adjacent arm module 2a having the same construction as the arm module 2b. Similarly, the frusto-conical surface on the distal end of the articulate portion 12b fits the mating frusto-conical surface on the proximal end of the arm portion 11c of the adjacent arm module 2c having the same construction as the arm module 2b. The drive shaft 14b is born by bearings 19b, 20b in the arm portion 11b and carries bevel gears 15b and 16b at both ends thereof as explained before. The articulate 25b is mounted at the distal end of the arm portion 11b for swinging about an axis 100b extending perpendicularly to the axis 102. The bevel gear 15b engages with the bevel gear 17a of the arm module 2a, while the bevel gear 17b engages with the bevel gear 15c of the arm module 2c. The bevel gears 17a and 17b have an identical construction. Similarly, the bevel gears 15b and 15c have an identical construction.

The articulate shaft 13b is coaxial with the shaft 25b and is fixed at its one end to the articulate portion 12b while at the other end is mounted on the arm portion 11b through a bearing 26b. The articulate portion 12b is swingably mounted onto the arm portion 11b through a bearing 27b. The axis of the bearing 26b and the articulate shaft 13b coincide with the axis 100b of the shaft 25b, so that the articulate portion 12b is swingable about the axis 100b, in directions of an arrow 101b.

Figure 4:
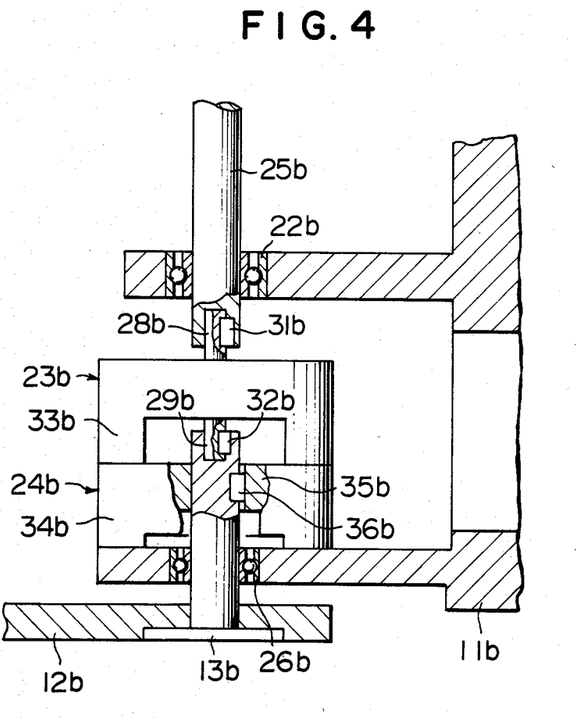
FIG. 4 is a fragmentary enlarged view of the portion A shown in FIG. 3.

A clutch 23b and a brake 24b are mounted on the portion of the arm portion 11b adjacent to the articulate shaft 13b. As will be seen from FIG. 4, the clutch 23b has an input shaft 28b and an output shaft 29b which are connected to the shaft 25b and the articulate shaft 13b respectively through keys 31b and 32b. The clutch 23b also has a housing 33b fixed to a housing 34b of the brake 24b which in turn is fixed to the arm portion 11b. The articulate shaft 13b extends through the center of the brake 24 and is coupled through a key 36b to the input shaft 35b of the brake 24b which is coaxial with the articulate shaft 13b. The clutch 23b and the brake 24b are of electromagnetic type and are adapted to be turned on when the electric power is not supplied thereto. Namely, when the electric power is not supplied to the clutch 23b, the input shaft 28b and the output shaft 29b are operatively coupled to each other. Similarly, when the electric power is not supplied to the brake 24b, the input shaft 35b is braked by the brake 24b.

As shown in FIG. 3, an address decoder 40b and a control circuit 41b are provided within the arm portion 11b. The address decoder 40b is connected to the address line 110 and also to the control circuit 41b through a control line 114b. The control circuit 41b is connected to the data line 111, and also to the clutch 23b and the brake 24b through an output line 115b for the clutch and an output line 116b for the brake. Terminals 42b are provided on ends of the address line 110 and the data line 111 respectively, while terminals 43b are provided on the other ends thereof. The terminals 42b are fixed to a surface on the arm portion 11b fitting the articulate portion 12a of the adjacent arm module 2a, while the terminals 43b are fixed to a surface of the articulate portion 12b fitting the arm portion 11c of the adjacent arm module 2c. The terminals 43b and 42b have mutually engageable constructions. Thus, the terminals 43b engage with the terminals 42c on the arm module 2c having an identical construction to the terminals 42b, while the terminals 42b are coupled to terminals 43a on the arm module 2a having the same construction as the terminals 43b.

The abovementioned coupling manner between the adjacent arm modules is applied to another arm modules 2a, 2c, 2d, 2e and 2f. However, the connection between the distal end arm module 2f and the gripper and the connection between the proximal end arm module 2a and the base 4 are made through specific coupling manners which are basically the same as the abovementioned coupling manner between adjacent arm modules.

Figure 5:
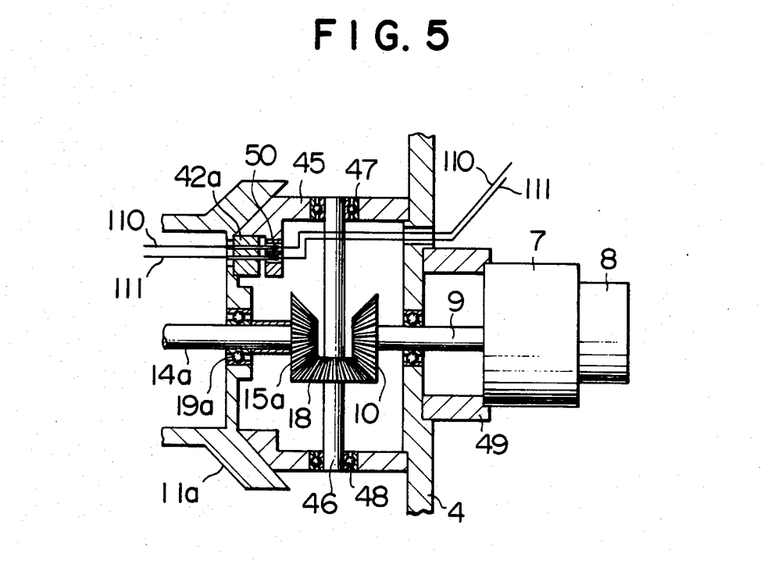
FIG. 5 is a longitudinal sectional view showing a connection mechanism between an arm module and a base of the manipulator shown in FIG. 1.

More specifically, the coupling between the arm module 2a and the base 4 is achieved through a construction basically identical to that employed for the connection between adjacent arm modules, namely, through mutual engagement between the complemental frusto-conical surfaces. The arm portion 45 is fixed to the base 4 and supports a shaft 46 through bearings 47 and 48. The motor 7 is attached to the base 4 through a pedestal 49. The bevel gear 18 fixed to the shaft 46 engages both the bevel gears 10 and 15a such as to form a gear train through which the torque of the motor 7 is transmitted to the drive shaft 14a. Terminals 50 are provided on a distal end inner peripheral surface of the arm portion 45 and connected to the terminals 42a. The address line 110 and the data line 111 are connected to the terminals 50.

Figure 6:
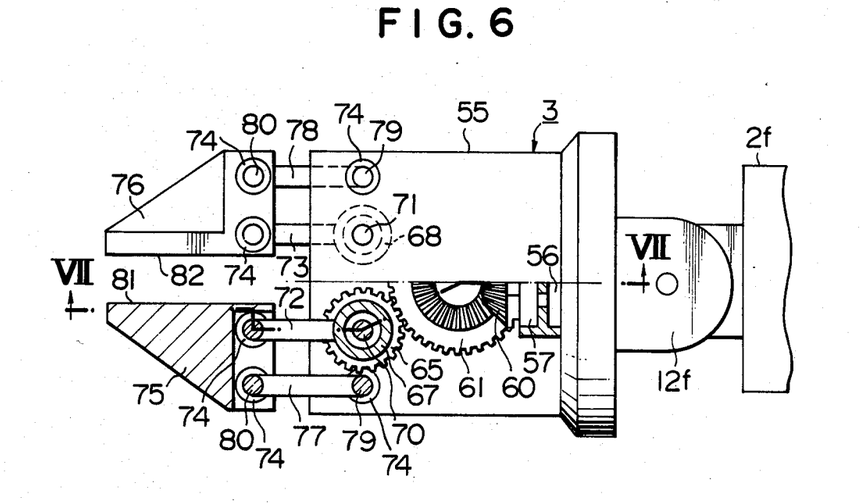
FIG. 6 is a partial sectional view of a gripper attached to the distal end of the manipulator shown in FIG. 1.
Figure 7:
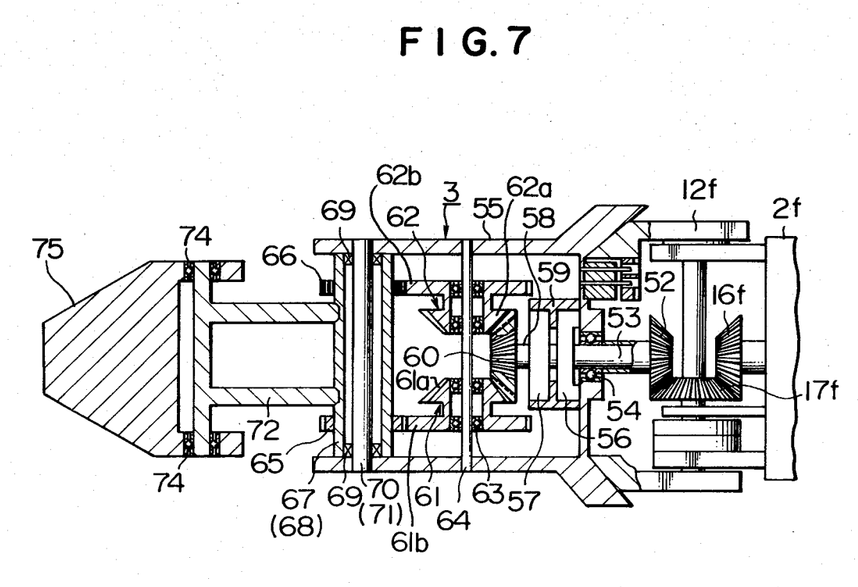
FIG. 7 is a sectional view taken along the line VII—VII of FIG. 6.

As shown in FIGS. 6 and 7, the gripper 3 is coupled to the end of the articulate portion 12f of the distal arm module 2f. A bevel gear 52 is fixed to one end of the drive shaft 53 and meshes with the bevel gear 17f. The drive shaft 53 is supported within a housing 55 through a bearing 54. The other end of the drive shaft 53 is coupled to the input shaft of a clutch 56 fixed to the housing 55. An output shaft 58 of the clutch 56 extends through a brake 57 and is connected to the input shaft (not shown) of the brake 57. The brake 57 is fixed to the housing 55 through the housing 59. The construction and the operation of the clutch 56 and the brake 57 are not described because they are materially identical to those of the clutches and brakes on the arm modules. The bevel gear 60 is fixed to the end of the output shaft 58 and engages the gear units 61 and 62 which are mounted through bearings 63 on a post 64 fixed to the housing 55. As will be clearly seen from FIG. 7, each of the gear units 61 and 62 has a bevel gear 61a, 62a and a spur gear 61b, 62b which are provided on a single piece member. The bevel gears 61a, 62a engage a common bevel gear 60, while the spur gears 61b, 62b mesh spur gears 65, 66 which are provided on shafts 67 and 68, respectively. The shafts 67 and 68 are swingably mounted through bearings 69 onto posts 70, 71 fixed to the housing 55. Link members 72 and 73 are fixed at ones of their ends to the shafts 67 and 68 while the other ends of these link members are provided with fingers 75, 76 through bearings 74. Link members 77 and 78 are provided at both of their ends with shafts 79 and 80 which are mounted through bearings 74 to the housing 55 and the finger 75, respectively. The link members 72 and 77 constitute a parallelogram link mechanism. An identical parallelogram link mechanism is formed by the link members 73 and 78. Consequently, the fingers 75 and 76 are moved towards and away from each other while keeping the parallel relation therebetween, in accordance with the rotation of the shafts 67 and 68, thereby gripping and releasing an object. More specifically, a rotation of the drive shaft 58 causes a rotation of the bevel gear 60 which in turn drives the gears 61 and 62 in the opposite directions. Consequently, the spur gears 65 and 66 meshing with these gears 61 and 62 also rotate in the opposite directions. This in turn drives the shafts 67 and 68 in the opposite directions so that the fingers 75 and 76 are moved towards or away from each other while keeping their gripping surfaces 81 and 82 in parallel with each other. Whether the fingers move towards or away from each other depends on the direction of rotation of the drive shaft 58. Namely, when the drive shaft 58 is rotated clockwise as viewed from the right side in the drawing, the fingers 75 and 76 are moved away from each other. On the other hand, when rotated counter-clockwise, the fingers move towards each other. Needless to say, the drive shaft 58 is driven by the motor 7 through the drive shafts 14a to 14f which are drivingly connected each other by the bevel gears 15a-15f, 16a-16f, 17a ∝ 17f, 10, 18 and 50.

Figure 8:
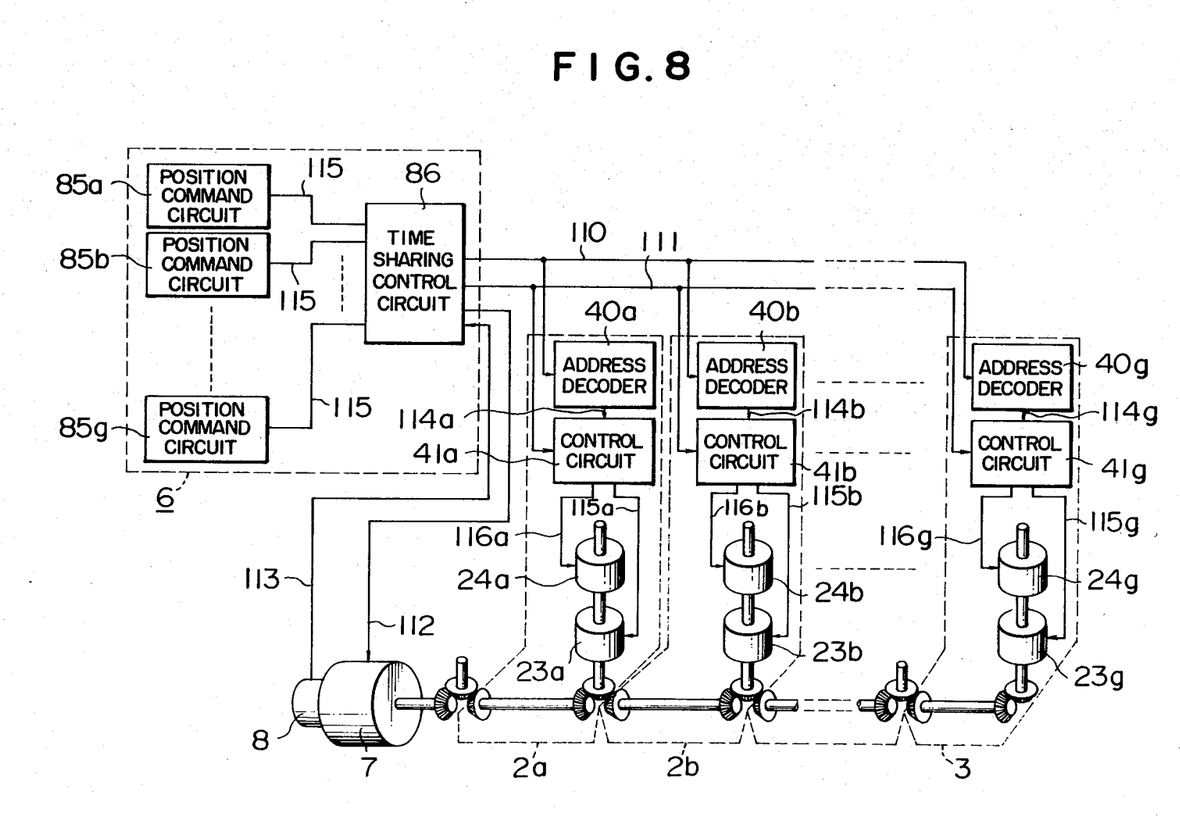
FIG. 8 is a block diagram of a manipulator control system.

Referring to FIG. 8, the control system 6 of this manipulator has seven articulate angular position commanding circuits 85a to 85g and a time sharing control circuit 86 to which these circuits 85a to 85g are connected through the respective data lines 115. The commanding circuits 85a 85f are adapted to command the corresponding angular positions of the articulates of the arm modules 2a to 2f, while the commanding circuit 85g commands the position of the fingers of the gripper 3. Although omitted from FIGS. 6 and 7, an address decoder 40g, an articulate position control circuit 41g and associated signal lines are accommodated within the gripper 3.

The construction and operation of each constituent of the control system shown in FIG. 8 will be explained hereinunder.

The required posture of the manipulator 1 at a certain moment is given in the form of command values of angular positions of the articulates issued from the articulate angular-position commanding circuits 85a–85g. The signals issued from the articulate angular position commanding circuits 85a–85g are delivered to the time-sharing control circuit 86. The time-sharing control circuit 86 is adapted to successively output the address codes Ac and the articulate control data Dc for respective arm modules 2a to 2f to the address line 110 and the data line 111, periodically.

In general, the bit number k of the address signal is required to satisfy the following logarithmic function with the base 2:

$$k > \log_2(n+1) \quad (1)$$

where, n represents the number of degrees of freedom of the manipulator. In the case of the described embodiment where the manipulator has 7 degrees of freedom, so the required address bit number k has to be three or more ($k \geq 3$). However, since no redundant address exists in the case of k=3, the bit number k is selected to be four (4) so as to attain a greater adaptability or flexibility to any increase in the number of articulates. Table 1 shows an example of the address codes allotted for respective arm modules.

TABLE 1

| Arm module | Address decoder | Address code |
|---|---|---|
| Arm module 2a | 40a | 0001 |
| Arm module 2b | 40b | 0010 |
| Arm module 2c | 40c | 0011 |
| Arm module 2d | 40d | 0100 |
| Arm module 2e | 40e | 0101 |
| Arm module 2f | 40f | 0110 |
| Gripper | 40g | 0111 |
| No appointment of articulate | | 0000 |
| Address for extension | | 1**** |

*: 0 or 1

Figure 9:
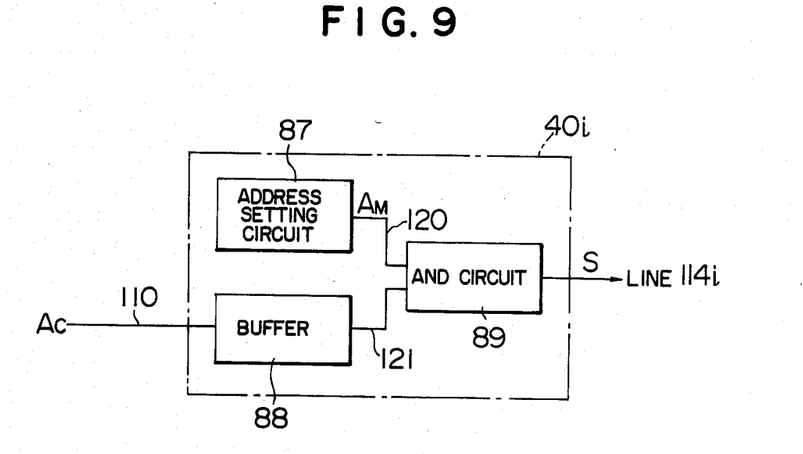
FIGS. 9 and 10 are block diagrams of a address decoder and an articulate control circuit respectively shown in FIG. 8.

The described embodiment has 8 addresses for extension so that the degree of freedom is extendable to the maximum value 15, i.e. $2^k - 1 = 2^4 - 1 = 15$. If a degree of freedom exceeding 15 is necessary, the address bit number should be determined in accordance with the above formula (1) so as to realize such degree of freedom As shown in FIG. 9, the address decoder $40i$ (i: $a \sim g$) is composed of an address setting circuit 87, a buffer 88 and an AND circuit 89. The address setting circuit 87 has a plurality of switches which are adapted to be selectively turned on and off to produce peculiar address bit patterns $A_M$ which are delivered to the AND circuit 89 through a signal line 120. The buffer 88 is connected to the address line 110 and is connected to the AND circuit 89 through the signal line 120. The outputs from the AND circuit 89 is delivered to the control line $114i$.

The address code Ac from the time sharing circuit 86 to the address line is stored in the buffer 88 and is delivered to the AND circuit 89 through the control line 121. The AND circuit 89 computes the logical AND between the address bit pattern $A_M$ and the address code $A_C$ and deliveres a bit signal corresponding to the following output S to the control line $114i$.

$$A_M \bigodot{X} A_C = 0 \rightarrow S = 1$$

$$A_M \bigodot{X} A_C = 0 \rightarrow S = 0$$

In the described embodiment, the address setting means is so pre-setted that the address bit patterns $A_M$ for respective modules correspond to the patterns shown in Table 1.

Figure 10:
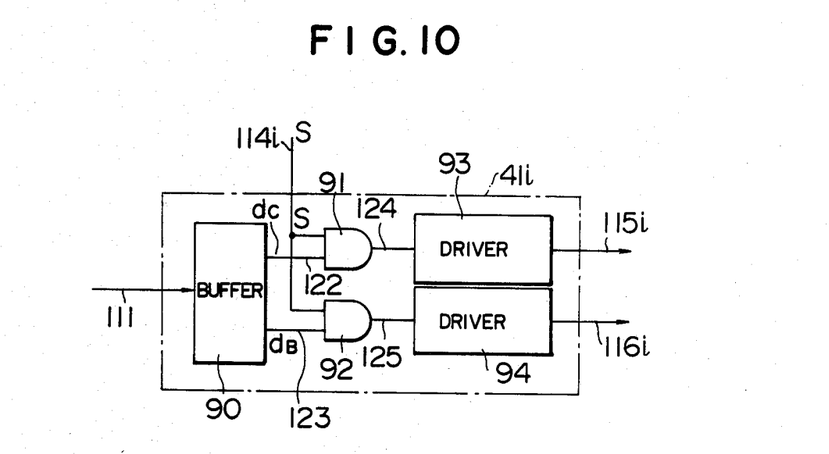

As shown in FIG. 10, the articulate control circuit $41i$ (i: $a \sim g$) is composed of the following parts: namely, a buffer 90 to which the data line 111 and signal lines 122, 123 are connected; an AND circuit 91 to which the signal line 122, the control line $114i$ and the signal line 124 are connected; an AND circuit 92 to which the signal line 123, the control line $114i$ and the signal line 125 are connected; and drivers 93, 94 to which are connected signal lines 124, 125 and 115, 116, respectively.

Assume here that the bit pattern of the 2-bit data Dc delivered to the data line 111 is expressed as follows:

$$D_C = (d_C, d_B)$$

where, $d_C$ and $d_B$ represent the control signals for the clutch 23 and the brake 24, which take, respectively, a level "1" in the "on" state thereof and a level "0" in the "off" state thereof. The control signals $d_C$ and $d_B$ are delivered to the AND circuits 91 and 92 through the signal lines 122 and 123, so that the logical ANDs of these control signals $d_C$ and $d_b$ and the control signal S from the control line $114i$ are produced by these AND circuits. The driver 93 operates to turn the clutch on when the output from the associated AND circuit 91 is "1", while the driver 94 operates to release the brake when it receives the output "1" from the associated AND circuit 92.

The operation of the articulate control circuit 41 is summarized as below:
On a condition: S=1 and $d_C=1 \rightarrow$ clutch ON (connected)
On a condition: S=1 and $d_B=1 \rightarrow$ brake OFF (release)

The clutch is "OFF" and the brake is "ON" when these conditions are not satisfied.

Consequently, the articulate control circuit in the arm module having the address pattern $A_M$ matching the address code $A_C$ delivered to the address line 110 is validated alone. In consequence, the brake and the clutch associated with this arm module are driven to actuate the articulate of this arm module according to the data $D_c$ delivered to the data line 111. The amount of angular movement of the articulate is computed out on the basis of the variance in the encoder 8 during the period in which the same address bit pattern $A_M$ is maintained, which is inputted to the time-sharing circuit 86.

As explained before, the address code $A_D$ is successively changed after a predetermined period so as to conform with the address bit patterns of successive articulates. Assume here that the address pattern $A_D$ has been maintained in conformity with the address bit pattern $A_M$ peculiar to one of the articulates. Then, immediately after the change of the address code, the amount of operation of this articulate is fed back to the articulate command control circuit of this articulate and is compared with the articulate angular-position command so as to produce a next command. After a predetermined time interval, the articulate control circuit of this articulate is validated again to effect a further control of the articulate position.

As described above, the angular positions of the articulates of the arm modules are controlled and then the position of the distal end of the manipulator and the opening and closing position of the gripper are controlled.

Although not shown, electric power supply lines are provided to supply respective circuits with electric power from a power source accommodated in the control system 6.

Figure 11:
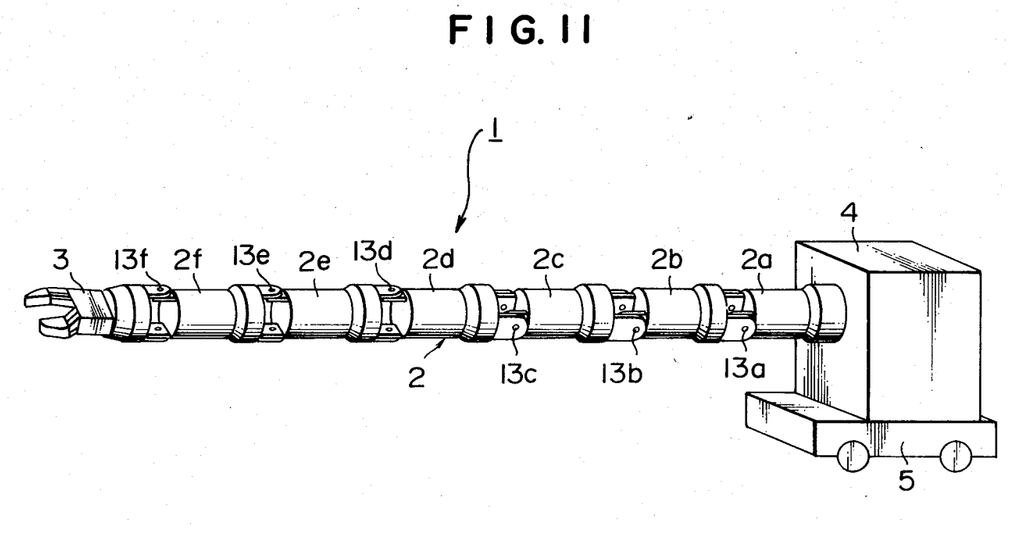
FIGS. 11 is a perspective view of another embodiment of a manipulator in accordance with the present invention.
Figure 12:
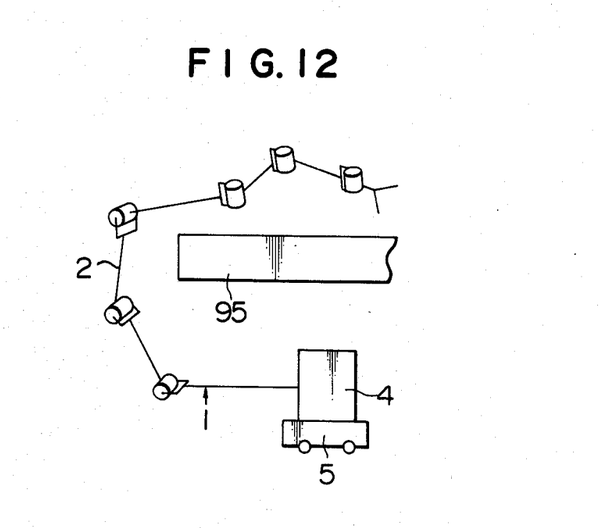
FIG. 12 is an illustration showing the respective articulate positions of the manipulator shown in FIG. 11.

In the embodiment described hereinbefore, the arm modules are arranged such that the articulate shafts of adjacent arm modules extend orthogonally each other. This, however, is not exclusive and the orientation of the arm modules 2a to 2f may be varied in various ways. For instance, FIG. 11 shows a modification in which the arm modules 2a, 2b, 2c are articulated such that their articulate axes 13a, 13b, 13c extend in parallel, while the arm modules 2d, 2e, 2f are articulated such that the articulate axes 13d, 13e, 13f thereof extend in parallel one another and extend perpendicular to the articulate axis 13c. With such a construction, the gripper can approach the object by detouring an obstacle 95 as schematically shown in FIG. 12.

As has been described, according to the invention, the construction of the arm and articulates can be very much simplified because the angular positions of all articulates can be controlled by means of a single drive shaft unit.

Figure 13:
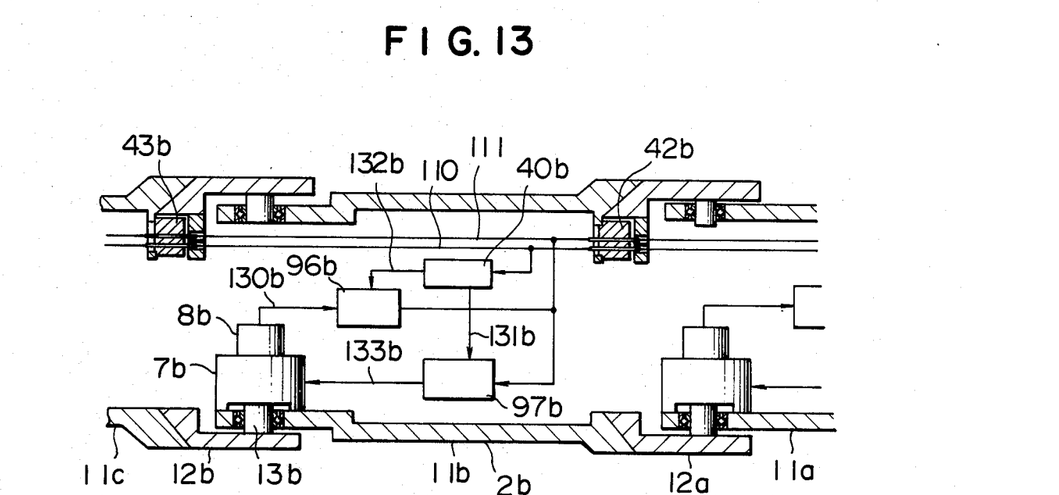
FIG. 13 is a fragmentary longitudinal sectional view of other embodiment of a manipulator in accordance with the present invention.

FIG. 13 shows another embodiment having a construction of the arm modules 2a to 2f different from the construction of those shown in FIG. 3. Namely, this embodiment employs a motor 7b and an encoder 8b in place of the clutch 23b, brake 24b, drive shaft 14b, bevel gears 15b, 16b, 17b and other related elements, while the control line 114b leading from the address decoder 40b is substituted by lines 131b, 132b. Furthermore, an additional buffer 96b is used and a driver 97b is provided in place of the articulate control circuit 41b. In this embodimnet, two address bit patterns concerning the motor 7b and the encoder 8b are used as the code peculiar to the address code 97b. The address bit patterns are determined, for example, as shown in Table 2 below.

TABLE 2

| Module number | Address decoder | Device | Address bit pattern |
| --- | --- | --- | --- |
| Arm module 2a | 40a | Motor | 0001 |
| | | encoder | 1001 |
| Arm module 2b | 40b | Motor | 0010 |
| | | Encoder | 1010 |
| Arm module 2c | 40c | Motor | 0011 |
| | | Encoder | 1011 |
| Arm module 2d | 40d | Motor | 0100 |
| | | Encoder | 1100 |
| Arm module 2e | 40e | Motor | 0101 |
| | | Encoder | 1101 |
| Arm module 2f | 40f | Motor | 0110 |
| | | Encoder | 1110 |
| Gripper 3 | 40g | Motor | 0111 |
| | | Encoder | 1111 |
| No appointed articulate | | | 0000 |
| | | | 1000 |

The motor 7b includes a reduction gear (not shown) fixed to the arm portion 11b. The output shaft of the motor 7b is connected to the articulate shaft 13b. The encoder 8b is fixed to the motor 7b so as to detect the angle of rotation of the motor output shaft.

The driver 97b is enabled when the signal "1" is delivered thereto through the control line 131b, and delivers an output to the motor 7b, which corresponds to the signal transmitted through the data line 111. On the other hand, the buffer 96b latches the signal from the encoder 8b and delivers a latch signal to the data line 111 when the signal "1" is delivered through the control line 132b.

As will be understood from the foregoing description, this embodiment is distinguished from the preceding embodiment in that the angular positions of articulates are controlled through delivery of data concerning both the motors 7b and the encoders 8b.

According to this embodiment, since the motors and the encoders are mounted on the respective articulate shafts, the independent servo system can be constituted with the respective are modules. Accordingly, even if the magnitude of the torque to be required for the respective arm modules is substantially different from one another, the angular position of the articulate portion of the arm module can be controlled rapidly because the change of the torque magnitude is not required between the arm modules.

According to the present invention, one or more articulates can be selectively controlled even through the control lines are common, so that the manipulator can be composed of a plurality of arm modules having an identical construction. This in turn allows free replacement or exchange of modules, rearrangement of degrees of freedom and increase or decrease of the degrees of freedom without requiring any change in the design. In addition, only one spare arm unit suffices as a common spare part for all arm modules.

What is claimed is:

1. A manipulator comprising: an arm constituted by a plurality of arm modules articulated to one another in series, each arm module having an articulate and an address decoder; a driving means for driving said arm; and a control system for controlling the operation of said arm; wherein said control system includes a plurality of articulate angular-position commanding circuits for commanding the operation of corresponding arm modules, and a time-sharing control circuit for delivering the command data from said articulate angular-position commanding circuits to corresponding arm modules; said driving means includes a driving source provided on one end of said arm and a drive shaft unit extending through said arm for transmitting the power of said driving source to said arm modules, said drive shaft unit being divided into section accommodated by respective arm modules, each drive shaft section being connected through gears to the drive shaft section in adjacent arm module, a torque from said driving source being transmitted selectively to an articulate portion of said arm module through a clutch and a brake provided therein, said driving source being a motor the torque of which is transmitted to the drive shaft sections in respective arm modules through bevel gears and the amount of rotation of the output shaft of said motor is feedback to said control system through an encoder, the drive shaft section in each arm module being connected to the drive shaft sections of the adjacent arm modules through bevel gears, the distal end of each arm module being provided with an articulate portion through an articulate shaft for swinging thereabout, which extends perpendicularly to the axis of said drive shaft, said distal end further having an additional shaft swingably mounted on the distal end of said arm module and disposed coaxially with said articulate shaft, said additional shaft carrying a bevel gear meshing with bevel gears each fixed to the end of the drive shaft section of the adjacent arm module so as to transmit the power, said articulate shaft being drivingly connected through a clutch and a brake to a shaft provided on the distal end of said arm module extending perpendicularly to the axis of said drive shaft.

2. A manipulator according to claim 1, wherein each arm module is provided with an articulate control circuit, said control system being adapted to deliver control data to said address decoder and, said articulate control circuit of each arm module so that said clutch and said brake are selectively operated by said articulate control circuit.

3. A manipulator according to claim 1, wherein the articulate of the distal end arm module is provided with a gripper having a pair of fingers adapted to be operated by the motor for driving arm module.

4. A manipulator according to claim 2, wherein each arm module accommodates an address line and a data line, said address line and said data line being connected to terminals provided on the distal end and proximal end of said arm module, said terminals being constructed so as to engage with each other when said arm module is connected to adjacent arm modules, said address line and said data line being connected to said control system, and wherein in each arm module said address line and said address decoder, said data line and said articulate control circuit, and said address decoder and said articulate control circuit are connected to each other, respectively.

5. A manipulator according to claim 1, wherein two adjacent arm modules are so connected that the articulate shafts thereof extend orthogonally to each other.

6. A manipulator according to claim 1, wherein said arm consists of at least two arm module groups each group including a plurality of arm modules each of which is so connected to two adjacent arm modules that the articulate shafts extend in parallel with one another, and wherein the articulate shafts of one group extend orthogonally to the articulate shafts of the adjacent groups.

7. A manipulator comprising:

an arm constituted by a plurality of arm modules articulated to one another in series, each having an articulate;

means for driving said arm including a single driving source provided on one end of said arm, and a single driving shaft constituting a single torque transmission line and extending through said arm for transmitting a torque from said single driving source to said arm modules, said single driving shaft being divided into sections each of which is accommodated by the respective arm modules;

gear means provided in each of said for connecting the associated driving shaft section to driving shaft sections of adjacent arm modules and for selectively transmitting the torque from said driving source to said articulate provided therein;

clutch means provided in each of said arm modules for operating the associated gear means to transmit the torque from said driving source to said articulate of said arm module;

a control system for controlling an operation of said arm including a plurality of articulate angular position commanding circuits for commanding the operation of the corresponding arm module, and a time-sharing control circuit for sequentially delivering the command data from said articulate angular position commanding circuits to the corresponding arm modules; and an address decoder provided in each of said arm modules for allowing said clutch means of the corresponding arm module to be operated to thereby drive the corrsponding articulate in response to the command data from the corresponding articulate angular position commanding circuit delivered through said time-sharing control circuit, whereby each articulate of the arm module is moved time-sharingly to a corresponding articulate angular position by the torque from said single driving source through said single driving shaft.

8. A replaceable arm module for cooperating with adjacent arm modules to form an articulated arm, said arm module comprising:

a hollow cylindrical member;

a hollow articulate member detachably mounted at one end thereof to one end portion of a cylindrical member of said adjacent arm module;

a swing shaft rotatably mounted in said cylindrical member and extending diametrically;

an articulate shaft fixed to said articulate member, said articulate shaft being disposed between the other end portions of said cylindrical and said articulate members for enabling said articulate member to swing about an axis of said articulate shaft, said articulate shaft being independent of and coaxially with said swing shaft;

a driving shaft longitudinally extending through said cylindrical and said articulate members;

two bevel gears each provided on either end of said driving shaft;

. a bevel gear mounted on said swing shaft for meshing with one of said bevel gears provided on said driving shaft and a bevel gear provided on one end of a driving shaft of said adjacent arm module so as to transmit a torque from a driving source to said driving shaft of said adjacent arm module;

clutch means provided between said articulate shaft and said swing shaft for selectively connecting said articulate shaft to said swing shaft; and an address decoder for enabling said clutch means to connect said articulate shaft so said swing shaft in response to an articulate angular position command data from a control circuit, whereby said articulate member is moved to a corresponding angular position.

* * * * *